US010962958B2

(12) United States Patent
Sharon et al.

(10) Patent No.: US 10,962,958 B2
(45) Date of Patent: Mar. 30, 2021

(54) LIBRARY OF PREDEFINED SHAPES FOR ADDITIVE MANUFACTURING PROCESSES

(71) Applicant: United Technologies Corporation, Farmington, CT (US)

(72) Inventors: John A. Sharon, West Hartford, CT (US); Vijay Narayan Jagdale, South Windsor, CT (US); Sergei F. Burlatsky, West Hartford, CT (US); David Ulrich Furrer, Marlborough, CT (US); Tahany Ibrahim El-Wardany, Bloomfield, CT (US); Ranadip Acharya, Rocky Hill, CT (US); Alexander Staroselsky, Avon, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 752 days.

(21) Appl. No.: 15/613,750

(22) Filed: Jun. 5, 2017

(65) Prior Publication Data
US 2018/0348736 A1  Dec. 6, 2018

(51) Int. Cl.
| | |
|---|---|
| *B33Y 10/00* | (2015.01) |
| *G06F 30/00* | (2020.01) |
| *G05B 19/4099* | (2006.01) |
| *B33Y 50/00* | (2015.01) |
| *B29C 64/153* | (2017.01) |
| *B29C 64/386* | (2017.01) |
| *B33Y 30/00* | (2015.01) |
| *G06F 30/23* | (2020.01) |

(Continued)

(52) U.S. Cl.
CPC .......... *G05B 19/4099* (2013.01); *B22F 10/00* (2021.01); *B29C 64/153* (2017.08); *B29C 64/386* (2017.08); *B33Y 10/00* (2014.12); *B33Y 30/00* (2014.12); *B33Y 50/00* (2014.12); *G06F 30/00* (2020.01); *G06F 30/23* (2020.01); *B22F 10/10* (2021.01); *G05B 2219/49023* (2013.01)

(58) Field of Classification Search
CPC ...... G05B 19/4099; G05B 2219/49023; G06F 30/23; G06F 30/00; B33Y 30/00; B33Y 10/00; B33Y 50/00; B22F 3/1055; B22F 2003/1057; B22F 10/00; B22F 10/10; B29C 64/386; B29C 64/153; Y02P 10/25
USPC .......................................................... 703/1
See application file for complete search history.

(56) References Cited

U.S. PATENT DOCUMENTS 9,522,426 B2    12/2016  Das et al.
9,569,564 B2 *  2/2017   Phillips .............. G05B 19/4097
(Continued)

FOREIGN PATENT DOCUMENTS

| DE | 102006056165 A1 | 5/2008 |
|---|---|---|
| GB | 2426607 A | 11/2006 |

OTHER PUBLICATIONS

DE102006056165 translation used (Year: 2008).*
(Continued)

*Primary Examiner* — Juan C Ochoa
(74) *Attorney, Agent, or Firm* — Kinney & Lange, P.A.

(57) ABSTRACT

A method includes accessing a first model defining a shape of a part. The shape of the part is segregated into a plurality of predefined shapes selected from a library of predefined shapes. The predefined models for each of plurality of predefined shapes are assembled into a second model defining the shape of the part. The part is additively manufactured according to the second model.

16 Claims, 5 Drawing Sheets

(51) Int. Cl.
*B22F 10/00* (2021.01)
*B22F 10/10* (2021.01)

(56) References Cited

U.S. PATENT DOCUMENTS

| | | | | |
|---|---|---|---|---|
| 2008/0281452 | A1* | 11/2008 | Okamoto | G06T 17/10 |
| | | | | 700/98 |
| 2012/0035887 | A1* | 2/2012 | Augenbraun | G06T 15/06 |
| | | | | 703/1 |
| 2013/0311450 | A1 | 11/2013 | Ramani et al. | |
| 2015/0105891 | A1 | 4/2015 | Golway et al. | |
| 2015/0158252 | A1* | 6/2015 | Liu | G05B 15/02 |
| | | | | 700/98 |
| 2015/0352792 | A1* | 12/2015 | Kanada | B29C 64/112 |
| | | | | 700/98 |
| 2016/0075090 | A1* | 3/2016 | Kautz | B29C 64/393 |
| | | | | 428/64.1 |
| 2016/0169821 | A1 | 6/2016 | Meyer et al. | |
| 2016/0332376 | A1* | 11/2016 | Ramirez Muela | B33Y 70/00 |
| 2017/0277168 | A1* | 9/2017 | Tanaka | G05B 19/4099 |

OTHER PUBLICATIONS

Allada V et al. "Feature-based modelling approaches for integrated manufacturing: state-of-the-art survey and future research directions", Journal of Computer Integrated Manufacturing, Taylor and Francis, Basingstoke, GB, vol. 8, No. 6, Nov. 1, 1995, pp. 411-440.
Regli W C et al., "Managing digital libraries for computer-aided design", Computer-Aided Design, Elsevier Publishers BV, Barking, GB, vol. 32, No. 2, Feb. 1, 2000, pp. 119-132.
Hildebrand K. et al., "Sketch-based pipeline for mass customization", ACM Siggraph 2013, New York, New York, Jan. 1, 2013, 1 page.
Extended European Search Report for European Patent Application No. 18176083.6, dated Nov. 7, 2018, 12 pages.

* cited by examiner

US 10,962,958 B2

LIBRARY OF PREDEFINED SHAPES FOR ADDITIVE MANUFACTURING PROCESSES

BACKGROUND

The present disclosure relates to additive manufacturing processes, and in particular, to creating a model for additive manufacturing processes.

Additive manufacturing is becoming increasingly popular as a means for manufacturing parts with complex shapes. Additive manufacturing allows a part to be manufactured layer-by-layer, which allows complex design features to be included in the part design when it was previously impossible. Additive manufacturing processes generally include the following steps. First, a three-dimensional model of the part is created using computer software. The computer model is then sliced into a plurality of layers. Information about the layers is then transmitted to an additive manufacturing machine. The additive manufacturing machine then builds the first layer of the part, and then builds the second layer of the part on top of the first layer. This process continues layer-by-layer to generatively build a part. Additive manufacturing processes are becoming more widely adopted for the production of complex near net shape parts, or parts that are close to their final form. Despite the advances of the technology, it remains difficult to repeatedly produce high quality parts with minimal defects and distortion.

The current approach to creating a suitable computer-aided design (CAD) model for additively manufacturing a part includes creating a CAD model for the desired part geometry and cutting it into layers. The additive manufacturing machine will typically dictate a scan path for each layer. Depending on the material being used, the additive manufacturing machine may select an energy source power level and scan speed, or the energy source power level and scan speed can be manually inputted into the additive manufacturing machine. A first part is then additively manufactured according to the CAD model, scan path, energy source power level, and scan speed. The first part is then analyzed for defects and distortion. The CAD model, scan path, energy source power level, and scan speed can then be adjusted based on the analysis of the first part, and a second part can be additively manufactured. This process continues until a CAD model, scan path, energy source power level, and scan speed is found that produces a part with minimal defects and distortion. This is a very timely, expensive, and resource intensive process.

There are two main issues with the current state of additive manufacturing processes. The first issue is that there exists a broad range of energy source power levels and scan speeds that can be employed to fuse a feedstock powder. Depending on the particular composition of the feedstock, certain combinations of power and speed may be inadequate to fuse particles or be excessive, such that the material boils or bubbles and causes pores to become trapped in the build. The second issue is that the scanning path is typically automatically generated by the additive manufacturing system based on the CAD file of the part. This scan path is de-coupled from the process parameters. This can cause defects and distortion to occur during a build, as certain scan paths may generate distortion and defects at certain energy source power levels and/or scan speeds.

SUMMARY

A method includes accessing a first model defining a shape of a part. The shape of the part is segregated into a plurality of predefined shapes selected from a library of predefined shapes. The predefined models for each of plurality of predefined shapes are assembled into a second model defining the shape of the part. The part is additively manufactured according to the second model.

An additive manufacturing system includes at least one processor and computer-readable memory. The computer readable memory is encoded with instructions that, when executed by the at least one processor, cause the additive manufacturing system to access a first model defining a shape of a part. The shape of the part is segregated into a plurality of predefined shapes selected from a library of predefined shapes. The predefined models for each of plurality of predefined shapes are assembled into a second model defining the shape of the part. The part is additively manufactured according to the second model.

DETAILED DESCRIPTION

Figure 1:
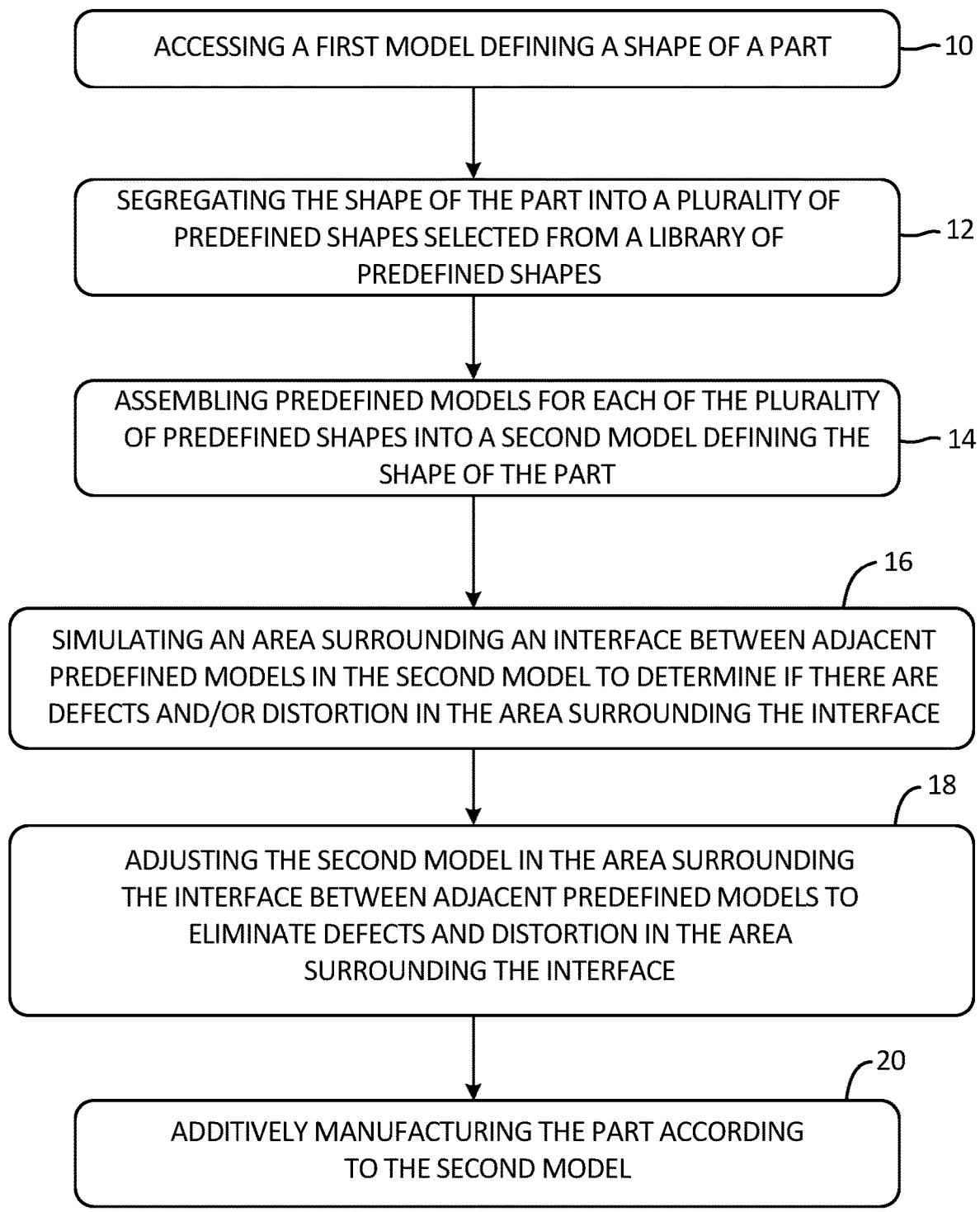
FIG. 1 is a flowchart showing a process for additively manufacturing a part.
Figure 2:
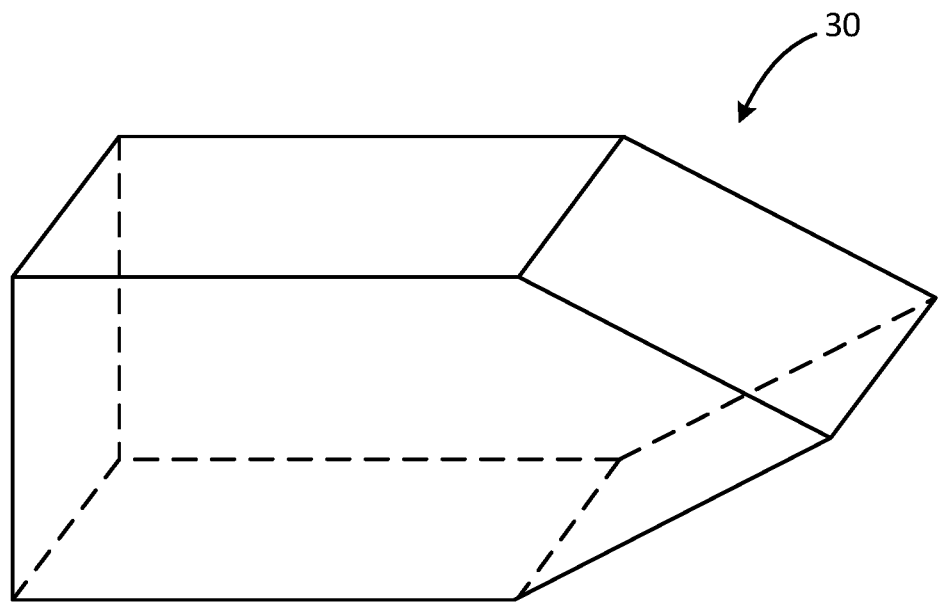
FIG. 2 is a schematic diagram of a first model of the part.
Figure 3:
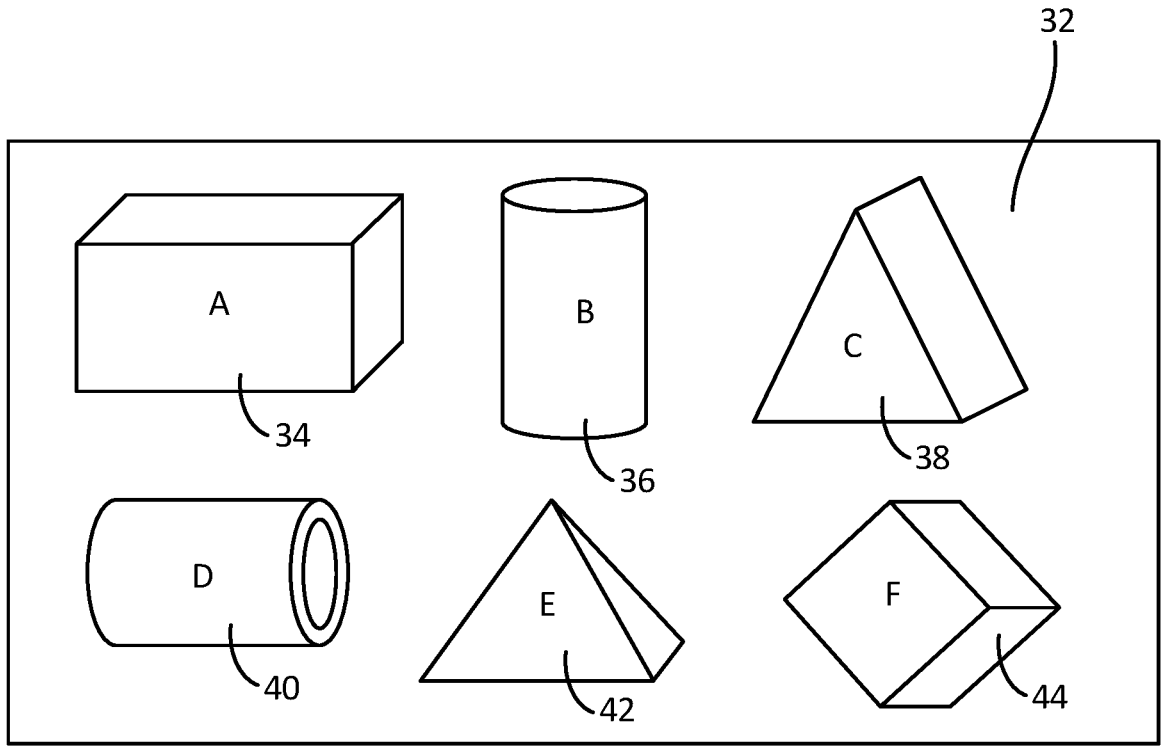
FIG. 3 is a schematic diagram of a plurality of predefined models in a library of predefined shapes.
Figure 4:
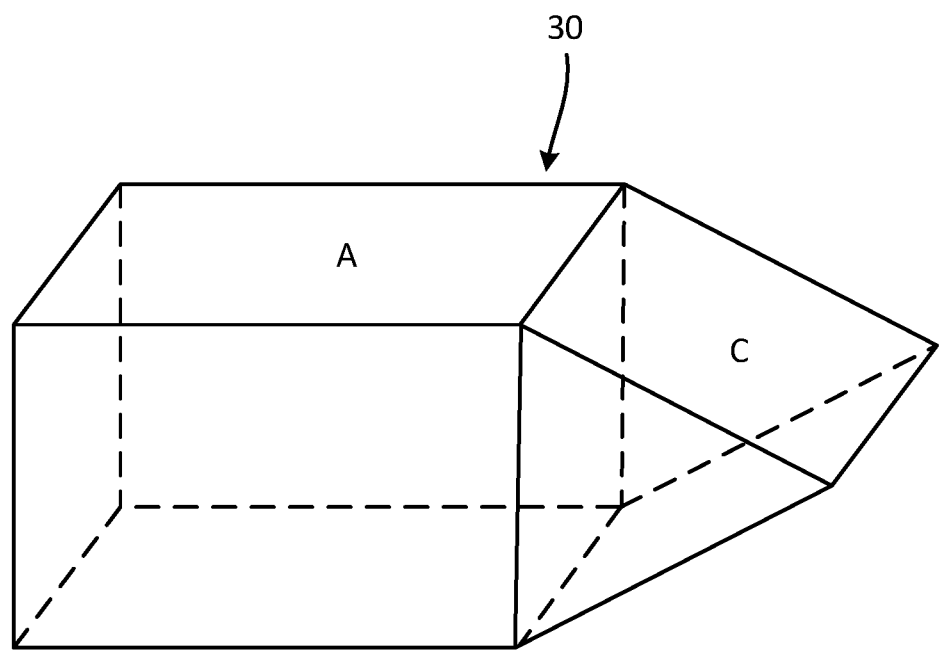
FIG. 4 is a schematic diagram of the first model of the part after it has been segregated into a plurality of predefined shapes.
Figure 5:
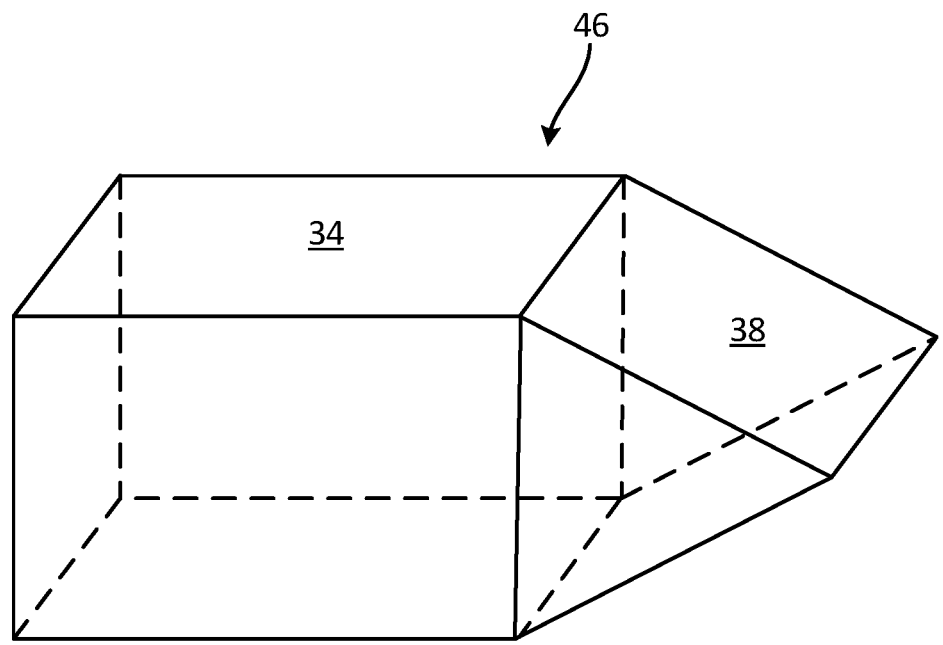
FIG. 5 is a schematic diagram of a second model of the part that has been assembled with predefined models from the library of predefined shapes.
Figure 6:
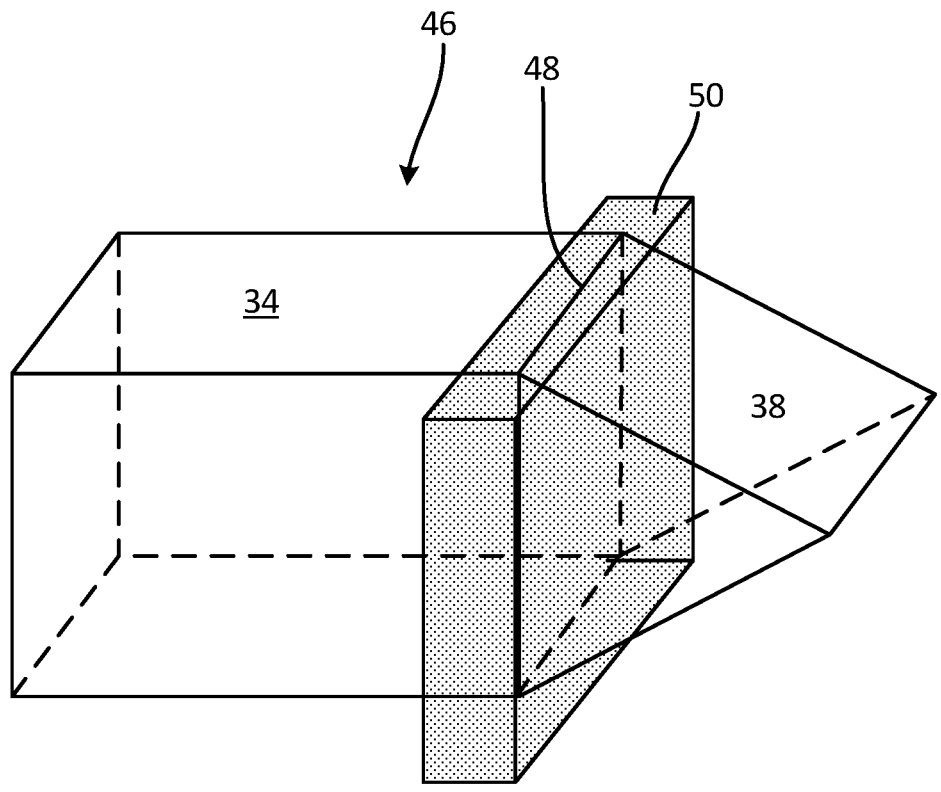
FIG. 6 is a schematic diagram of the second model of the part showing an area surrounding an interface between adjacent predefined models.
Figure 7:
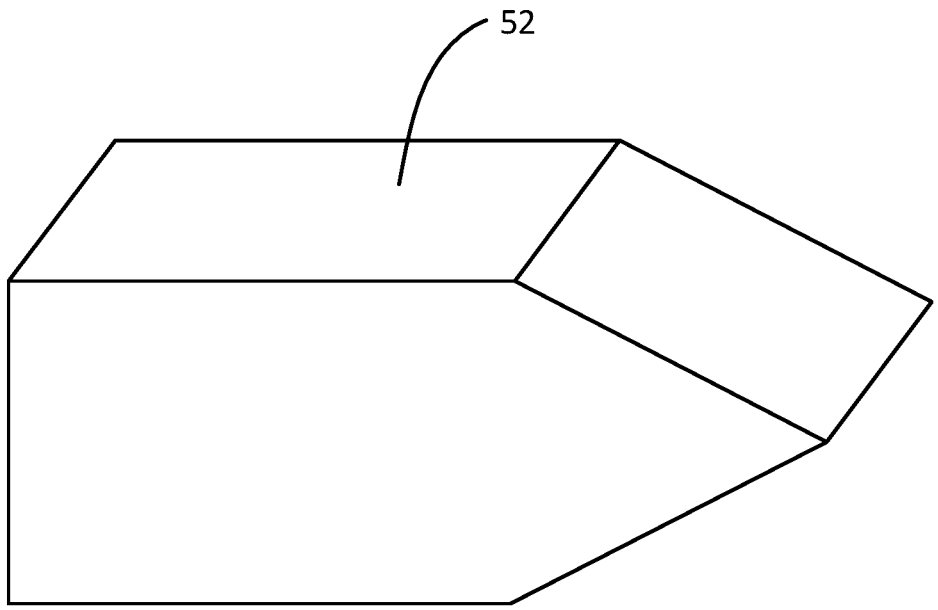
FIG. 7 is a perspective view of the part that has been additively manufactured.

FIG. 1 is a flowchart showing a process for additively manufacturing part 30. FIG. 1 includes steps 10, 12, 14, 16, 18, and 20 to show a process for additively manufacturing part 30. FIGS. 2-6 illustrate the steps seen in the flow chart is FIG. 1. FIG. 2 is a schematic diagram of first model 30 of the part. FIG. 3 is a schematic diagram of predefined models 34, 36, 38, 40, 42, and 44 in library 32 of predefined shapes A, B, C, D, E, and F. FIG. 4 is a schematic diagram of first model 46 of the part after it has been segregated into predefined shapes A and C. FIG. 5 is a schematic diagram of second model 46 of the part that has been assembled with predefined models 34 and 38 from library 32 of predefined shapes A, B, C, D, E, and F. FIG. 6 is a schematic diagram of second model 46 of the part showing area 50 surrounding interface 48 between adjacent predefined models 34 and 38. FIG. 7 is a perspective view of part 52 that has been additively manufactured.

Additive manufacturing processes manufacture parts layer-by-layer. A typical additive manufacturing process includes the following steps. First, a three-dimensional computer model of the part is created. Next the computer model of the part is sliced into a plurality of layers. Information about the first layer is then transmitted to an additive manufacturing machine, and the machine forms the first layer of the part. Included with the information about the first layer is information regarding an energy source power level, a scan path, and a scan speed to be used to build the first layer. The energy source power level refers to the intensity of the energy source that is used in the additive manufacturing machine to solidify the part. The scan path refers to the direction and path the energy source in the additive manufacturing machine moves to solidify a layer of the part. The scan speed refers to the speed with which the energy source moves in the additive manufacturing machine to solidify the part.

After the first layer is built, information about the second layer is then transmitted to the additive manufacturing machine, including information regarding the energy source power level, the scan path, and the scan speed. The machine forms the second layer of the part on the first layer of the part. This process continues, and each successive layer is built upon the previous layer to create a part that has been manufactured layer-by-layer. Any additive manufacturing process can be used to manufacture the part, including direct metal laser sintering, electron beam freeform fabrication, electron-beam melting, selective laser melting, or selective laser sintering. Further, the exact steps taken to generate the additively manufactured part can vary from the typical steps.

Step 10 includes accessing first model 30 defining a shape of a part, as shown in FIG. 2. First model 30 is a CAD model that represents the shape of the part that is desired to be built with additive manufacturing. First model 30 can be a model for a near net shape part, or a part that is close to its final form. FIG. 2 shows an example of first model 30, in which first model 30 is a model for a part with a cuboid portion and a prism portion. First model 30 shown in FIG. 2 is for example purposes. In alternate embodiments, first model 30 can be a model for a part with a more complex shape and design.

Step 12 includes segregating the shape of the part into predefined shapes A, B, C, D, E, and F, selected from library 32 of predefined shapes A, B, C, D, E, and F, as shown in FIGS. 3-4. Library 32 of predefined shapes A, B, C, D, E, and F is shown in FIG. 3A. Library 32 can include any suitable shape, including rings, cylinders, tubes, cubes, cuboids, prisms, pyramids, and any other suitable shapes. As shown in FIG. 3, predefined shape A is a cuboid; predefined shape B is a cylinder; predefined shape C is a prism; predefined shape D is a tube; predefined shape E is a pyramid; and predefined shape F is a cube. Predefined shapes A, B, C, D, E, and F in library 32 can also include features such as fillets and chamfers. Predefined shapes A, B, C, D, E, and F shown in FIG. 3 are examples of shape that can be included in library 32. Library 32 typically includes simple three-dimensional shapes that form building blocks for more complex shapes and designs.

As shown in FIG. 4, first model 30 can be segregated into predefined shape A, which is a cuboid, and predefined shape C, which is a prism. First model 30 can be segregated into any number of predefined shapes A, B, C, D, E, and F in library 32 in alternate embodiments.

Step 14 includes assembling predefined models 34, 36, 38, 40, 42, and 44 for each of predefined shapes A, B, C, D, E, and F in library 32 into second model 46 defining the shape of the part, as shown in FIGS. 3 and 5. Library 32 includes predefined models 34, 36, 38, 40, 42, and 44 that correspond to predefined shapes A, B, C, D, E, and F, respectively. Predefined models 34, 36, 38, 40, 42, and 44 are CAD models that have been cut into a plurality of layers for use in additively manufacturing a part with the predefined shape A, B, C, D, E, and F, respectively.

Predefined models 34, 36, 38, 40, 42, and 44 also include instructions for an energy source power level, a scan path, and a scan speed for the additive manufacturing machine to use during the additive manufacturing process. The energy source power level refers to the intensity of the energy source that is used in the additive manufacturing machine to solidify the part. The scan path refers to the direction and path the energy source in the additive manufacturing machine moves to solidify a layer of the part. The scan speed refers to the speed with which the energy source moves in the additive manufacturing machine to solidify the part. Each of predefined models 34, 36, 38, 40, 42, and 44 include instructions for an energy source power level, a scan path, and a scan speed that are known to result in additively manufactured parts with minimal to no defects and distortion. The energy source power level, the scan path, and the scan speed for each of predefined models 34, 36, 38, 40, 42, and 44 can be dependent on the material being used to additively manufacture the part and/or the temperature at which the additive manufacturing is taking place. Further, predefined models 34, 36, 38, 40, 42, and 44 can include a range of energy source power levels, a range of scan paths, and a range of scan speeds that are known to result in parts with minimal to no defects and distortion, and a specific parameter for each can be selected from the range of acceptable parameters.

Finite element simulations for thermal tracking and computational fluid dynamics can be used to calibrate predefined models 34, 36, 38, 40, 42, and 44. This enables predefined models 34, 36, 38, 40, 42, and 44 to be appropriately scaled (i.e., having the same geometry but different size) for use parts of any size.

As shown in FIG. 5, second model 46 of the part is formed with predefined model 34 and predefined model 38. Second model 46 is a CAD model that represents the shape of the part that is desired to be built with additive manufacturing. Second model 46 will have the same shape as first model 30. As shown in FIG. 4, first model 30 of the part is formed with predefined shapes A and C selected from library 32. As shown in FIG. 3, predefined models 34 and 38 correspond to predefined shapes A and C, respectively. Predefined models 34 and 38 can be pulled from library 32 and joined together to form second model 46 of the part, as shown in FIG. 5. Second model 46 has the same shape as first model 30. Each of predefined models 34 and 38 in second model 46 are broken into layers for use in additive manufacturing the part. Further, predefined models 34 and 38 in second model 46 include instructions for an energy source power level, a scan path, and a scan speed for the additive manufacturing machine to use while additively manufacturing the part. The energy source power level, the scan path, and the scan speed are specific to predefined models 34 and 38 and result in a part with minimal to no defects or distortion. In alternate embodiments, second model 46 can have any shape and can be built out of any number of predefined models 34, 36, 38, 40, 42, and 44.

Step 16 includes simulating area 50 surrounding interface 48 between adjacent predefined models 34 and 38 to determine if there are defects in area 50 surrounding interface 48, as shown in FIG. 6. Second model 46, as shown in FIG. 6, includes interface 48 formed where predefined models 34 and 38 meet one another. In alternate embodiments, second model 46 can have any shape and can be built out of any number of predefined models 34, 36, 38, 40, 42, and 44 and can include any number of interfaces 48.

Area 50 surrounds interface 48 and extends into a portion of predefined models 34 and 38. Predefined models 34 and 38 include instructions for an energy source power level, a scan path, and a scan speed that are selected to form predefined shapes A and C, respectively, with minimal to no defects or distortion. When predefined models 34 and 38 are put together to form second model 46, the energy source power level, the scan path, and the scan speed may not be suitable to form a part with minimal to no defects or distortion in area 50 surrounding interface 48 between predefined models 34 and 38. Thus, a simulation can be run in area 50 to determine if there are defects or distortion present in area 50 surrounding interface 48 when the energy source power level, the scan path, and the scan speed for the predefined models are used. Simulating area 50 can include creating a computational model for finite element analysis (FEA) or analytical expressions of area 50.

Step 18 includes adjusting second model 46 in area 50 surrounding interface 48 to eliminate defects in area 50 surrounding interface 48. As discussed above in reference to step 16, a simulation is run in area 50 surrounding interface 48 to determine if there are any defects or distortion in area 50 surrounding interface 48. If defects or distortion are found, the energy source power level, the scan path, and the scan speed can be adjusted in area 50 surrounding interface 48 in second model 46 as needed to create a part with minimal to no defects or distortion.

Step 20 includes additively manufacturing part 52 according to second model 46, as shown in FIG. 7. After second model 46 is deemed to be suitable for additively manufacturing a part with minimal to no defects or distortion, part 52 can be additively manufactured according to second model 46. As shown in FIG. 7, part 52 will have the shape and design of second model 46.

Additively manufacturing part 52 according to second model 46 will result in part 52 having minimal to no defects or distortion. The formation of defects in parts that are additively manufactured is mainly a function of the energy source power level, the scan path, and the scan speed used to additively manufacture the part. Pulling predefined models from a library of predefined shapes to assemble a second model to be used to manufacture a part allows for the part to have minimal to no defects or distortion, as the predefined models include instructions for the energy source power level, the scan path, and the scan speed to be used during the additive manufacturing process so that the parts have minimal to no defects or distortion.

Each of the predefined models will be created and tested to ensure that they repeatedly and reliably produce parts with minimal to no defects or distortion. Using the predefined models to manufacture a part eliminates the need to manufacture the part, analyze the part for defects and distortion, adjust the build strategy, and then remanufacture the part and start the process again. Rather, areas surrounding interfaces between the predefined models can be simulated to test for defects and distortion and the energy source power level, the scan path, and the scan speed can be adjusted in the area surrounding the interfaces between the predefined models as needed. Simulating an entire model for a part is extremely time and cost prohibitive, hence why it is not standard practice. However, having to only simulate an area surrounding interfaces between the predefined models greatly reduces the time and cost needed to simulate the part, allowing defects and distortion in the areas surrounding the interfaces between the predefined models to be identified.

Using predefined models from a library of predefined shapes allows parts to be rapidly modeled and manufactured using additive manufacturing processes. Further, using the predefined models allows the additively manufactured parts to have a high quality with minimal to no defects or distortion.

Figure 8:
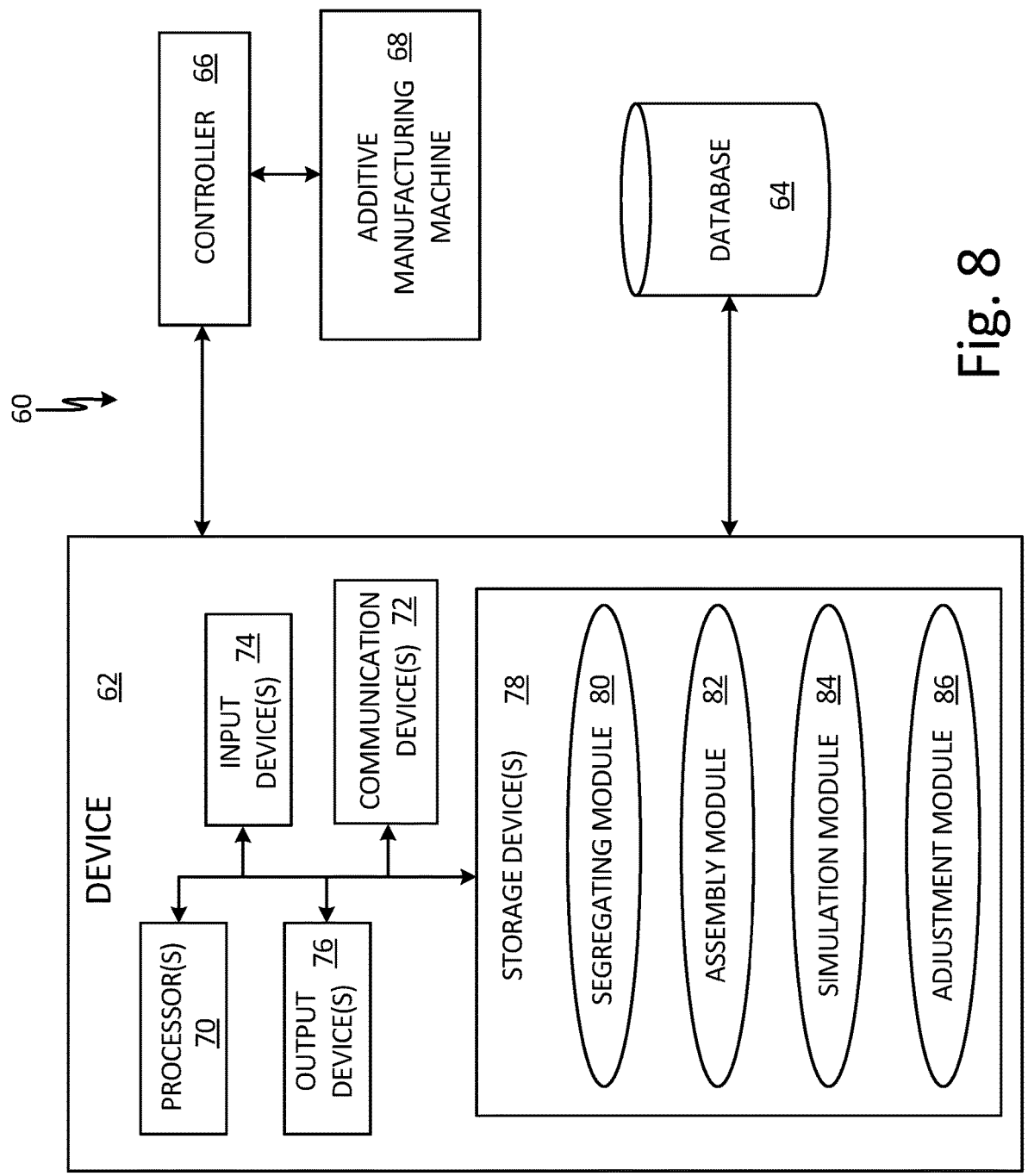
FIG. 8 is a schematic diagram of an additive manufacturing system.

FIG. 8 is a schematic diagram of additive manufacturing system 60. Additive manufacturing system 60 includes device 62, database 64, controller 66, and additive manufacturing machine 68. Device 62 includes processor(s) 70, communication device(s) 72, input device(s) 74, output device(s) 76, and storage device(s) 78. Storage device(s) 78 store computer-readable instructions that, when executed by processor(s) 70, cause device 62 to perform operations attributed herein to segregating module 80, assembly module 82, simulation module 84, and adjustment module 86. That is, while described herein as separate modules 80, 82, 84, and 86, in some examples, functionality attributed herein to modules 80, 82, 84, and 86 can be distributed among any one or more of the modules.

Additive manufacturing system 60 includes device 62 that communicates with database 64 and controller 66. Device 62 can communicate with database 64 and controller 66 with one or more wired or wireless connections, or both. Controller 66 communicates with and controls additive manufacturing machine 68. Controller 66 can communicate with additive manufacturing machine 68 with a wired and/or wireless connection. Controller 66 can be separate from or integrated with additive manufacturing machine 68. As such, device 62 communicates with additive manufacturing machine 68 via communications routed through controller 66.

Device 62 can be any device capable of executing computer-readable instructions defining a software program implementing steps 10-18 as discussed above in reference to FIGS. 1-7. Examples of device 62 can include, but are not limited to, laptop computers, mobile phones (including smartphones), tablet computers, personal digital assistants (PDAs), desktop computers, servers, mainframes, or other computing devices.

Database 64 can include one or more databases. Though illustrated in the example of FIG. 8 as separate from and communicatively coupled with device 62, in other examples, database 64 can be stored at storage devices 78 of device 62. Database 64 stores a library of predefined shapes, as discussed in reference to FIG. 3 above. Database 64 can include one or more relational databases, hierarchical databases, object-oriented databases, multi-dimensional databases, or other types of databases configured to store data useable by additive manufacturing system 60.

As illustrated in FIG. 8, device 62 can include processor(s) 70, communications device(s) 72, input device(s) 74, output device(s) 76, and storage device(s) 78. However, in certain examples, device 62 can include more or fewer components than components 70, 72, 74, 76, and 78. For instance, in examples where device 62 is a mobile or portable device such as a laptop computer, device 62 may include additional components such as a battery that provides power to components of device 62 during operation.

Processor(s) 70, in one example, are configured to implement functionality and/or process instructions for execution within device 70. For instance, processor(s) 70 can be capable of processing instructions stored in storage device(s) 78. Examples of processor(s) 70 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 78 can be configured to store information within device 62 during operation. Storage device(s) 78, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 78 are a temporary memory, meaning that a primary purpose of storage device(s) 78 is not long-term storage. Storage device(s) 78, in some examples, are described as volatile memory, meaning that storage device(s) 78 do not maintain stored contents when power to device 62 is turned off. Examples of volatile memories can include random access memories (RAM), dynamic random access memories (DRAM), static random access memories (SRAM), and other forms of volatile memories. In some examples, storage device(s) 78 are used to store program instructions for execution by processor(s) 70. Storage device(s) 78, in one example, are used by software or applications running on device 62 (e.g., a software program implementing architecture 10) to temporarily store information during program execution.

Storage device(s) 78, in some examples, also include one or more computer-readable storage media. Storage device(s) 78 can be configured to store larger amounts of information than volatile memory. Storage device(s) 78 can further be configured for long-term storage of information. In some examples, storage device(s) 78 include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Device 62, in some examples, also includes communications device(s) 74. Device 62, in one example, utilizes communication device(s) 74 to communicate with external devices via one or more networks, such as one or more wireless or wired networks or both. Communications device(s) 74 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Device 62, in some examples, also includes input device(s) 74. Input device(s) 74, in some examples, are configured to receive input from a user. Examples of input device(s) 74 can include a mouse, a keyboard, a microphone, a camera device, a presence-sensitive and/or touch-sensitive display, or other type of device configured to receive input from a user.

Output device(s) 76 can be configured to provide output to a user. Examples of output device(s) 76 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

As illustrated in FIG. 8, storage device(s) 78 can include segregating module 80, assembly module 82, simulation module 84, and adjustment module 86. In operation, processor(s) 70 can access a first model for a part that is to be additively manufactured, such as a first model stored at storage devices 78 or another computing device operatively coupled with device 62. The first model defines a shape of the part. Segregating module 80, assembly module 82, simulation module 84, and adjustment module 86, executing on processor(s) 70, perform operations to operations to additively manufacture a part according to a second model.

For example, segregating module 80 can segregate the first model into a plurality of predefined shapes selected from the library of predefined shapes in database 64. Assembly module 82 can assemble predefined models from the library of predefined shapes in database 64 into a second model. The predefined models from the library of predefined shapes in database 64 include parameters for use in additive manufacturing machine 68, including energy source power level, scan path, and scan speed. Simulation module 84 can simulate an area surrounding an interface between adjacent predefined models to determine if there are defects in the area surrounding the interface. If defects are found, adjustment module 86 can adjust the second model in the area surrounding the interface. Adjustment module 86 can adjust the parameters for the second model, including energy source power level, scan path, and scan speed, as needed to eliminate defects and distortion in the area surrounding the interface.

The second model can then be communicated by device 62 (e.g., via communication device(s) 72) to controller 66. Controller 66 can store the second model and provide instructions to additive manufacturing machine on how to build the part. Accordingly, device 62 illustrates one example embodiment of a device that can execute a software program including a plurality of segments that each includes one or more modules implementing an interface that enables direct communication between the respective module and modules that are members of any other of the plurality of segments.

Discussion of Possible Embodiments

The following are non-exclusive descriptions of possible embodiments of the present invention.

A method includes accessing, by a processor, a first model defining a shape of a part. The shape of the part is segregated, by a processor, into a plurality of predefined shapes selected from a library of predefined shapes. Predefined models for each of the plurality of predefined shapes are assembled, by a processor, into a second model defining the shape of the part. The part is additively manufactured according to the second model.

The method of the preceding paragraph can optionally include, additionally and/or alternatively, any one or more of the following features, configurations and/or additional components:

Wherein the predefined models for each of the plurality of predefined shapes in the library of predefined shapes includes instructions for an energy source power level, a scan path, and a scan speed to be used during additive manufacturing.

Wherein the energy source power level, the scan path, and the scan speed are dependent on the material being used to additively manufacturing the part.

Wherein the energy source power level, the scan path, and the scan speed create an additively manufactured part that has minimal to no defects or distortion.

Wherein the energy source power level, the scan path, and the scan speed are dependent on a temperature at which the part is being additively manufactured.

Wherein the plurality of predefined shapes in the library of predefined shapes can include shapes selected from the group consisting of rings, cylinders, tubes, cuboids, cubes, prisms, pyramids, and combinations thereof.

Wherein the plurality of predefined shapes in the library of predefined shapes include shapes with features selected from the group consisting of fillets, chamfers, and combinations thereof.

The method further includes simulating an area surrounding an interface between adjacent predefined models in the second model to determine if there are defects and/or distortion in the area surrounding the interface.

The method further includes adjusting the second model in the area surrounding the interface between adjacent predefined models to eliminate defects and distortion in the area surrounding the interface.

Wherein adjusting the second model in the area surrounding the interface includes adjusting the energy source power level, the scan path, and the scan speed for the second model in the area surrounding the interface.

An additive manufacturing system includes at least one processor, and computer-readable memory. The computer-readable memory is encoded with instructions that, when executed by the at least one processor, cause the additive manufacturing system to access a first model defining a shape of a part. The shape of the part is segregated into a plurality of predefined shapes selected from a library of predefined shapes. The predefined models for each of the plurality of predefined shapes are assembled into a second model defining the shape of the part. The part is additive manufactured according to the second model.

The additive manufacturing system of the preceding paragraph can optionally include, additionally and/or alternatively, any one or more of the following features, configurations and/or additional components:

Wherein the predefined models for each of the plurality of predefined shapes in the library of predefined shapes includes instructions for an energy source power level, a scan path, and a scan speed to be used during additive manufacturing.

Wherein the energy source power level, the scan path, and the scan speed are dependent on the material being used to additively manufacturing the part.

Wherein the energy source power level, the scan path, and the scan speed create an additively manufactured part that has minimal to no defects or distortion.

Wherein the energy source power level, the scan path, and the scan speed are dependent on a temperature at which the part is being additively manufactured.

Wherein the plurality of predefined shapes in the library of predefined shapes can include shapes selected from the group consisting of rings, cylinders, tubes, cuboids, cubes, prisms, pyramids, and combinations thereof.

Wherein the plurality of predefined shapes in the library of predefined shapes include shapes with features selected from the group consisting of fillets, chamfers, and combinations thereof.

Wherein the computer-readable memory, when executed by the at least one processor, will further cause the additive manufacturing system to simulate an area surrounding an interface between adjacent predefined models in the second model to determine if there are defects and/or distortion in the area surrounding the interface.

Wherein the computer-readable memory, when executed by the at least one processor, will further cause the additive manufacturing system to adjust the second model in the area surrounding the interface between adjacent predefined models to eliminate defects and distortion in the area surrounding the interface.

Wherein adjusting the second model in the area surrounding the interface includes adjusting the energy source power level, the scan path, and the scan speed for the second model in the area surrounding the interface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   accessing, by a processor, a first model defining a shape of a part;
   segregating, by a processor, the shape of the part into a plurality of predefined three-dimensional shapes selected from a digital library of predefined three-dimensional shapes;
   assembling, by a processor, predefined models for each of the plurality of predefined three-dimensional shapes into a second model defining the shape of the part, wherein the predefined models are obtained from the library and include instructions for an energy source power level, a scan path, and a scan speed to be used during additive manufacturing and wherein the predefined models have been cut into a plurality of layers for use in additively manufacturing the part using the predefined models;
   simulating only a portion of the second model to determine if there are defects and/or distortions in the portion simulated, the portion including an area surrounding an interface between adjacent predefined models in the second model; and
   additively manufacturing the part according to the second model.

2. The method of claim 1, wherein the energy source power level, the scan path, and the scan speed are dependent on the material being used to additively manufacturing the part.

3. The method of claim 1, wherein the energy source power level, the scan path, and the scan speed create an additively manufactured part that has no defects or distortion.

4. The method of claim 1, wherein the energy source power level, the scan path, and the scan speed are dependent on a temperature at which the part is being additively manufactured.

5. The method of claim 1, wherein the plurality of predefined three-dimensional shapes in the library of predefined three-dimensional shapes includes three-dimensional shapes selected from the group consisting of rings, cylinders, tubes, cuboids, cubes, prisms, pyramids, and combinations thereof.

6. The method of claim 1, wherein the plurality of predefined three-dimensional shapes in the library of predefined three-dimensional shapes include three-dimensional shapes with features selected from the group consisting of fillets, chamfers, and combinations thereof.

7. The method of claim 1, and further comprising:
   adjusting the second model in the area surrounding the interface between adjacent predefined models to eliminate defects and distortion in the area surrounding the interface.

8. The method of claim 7, wherein adjusting the second model in the area surrounding the interface includes adjusting the energy source power level, the scan path, and the scan speed for the second model in the area surrounding the interface.

9. An additive manufacturing system comprising:
   at least one processor; and
   computer-readable memory encoded with instructions that, when executed by the at least one processor, cause the additive manufacturing system to:
   access a first model defining a shape of a part;
   segregate the shape of the part into a plurality of predefined three-dimensional shapes selected from a digital library of predefined three-dimensional shapes;
   assemble predefined models for each of the plurality of predefined three-dimensional shapes into a second model defining the shape of the part, wherein the predefined models are obtained from the library and include instructions for an energy source power level, a scan path, and a scan speed to be used during additive manufacturing and wherein the predefined models have been cut into a plurality of layers for use in additively manufacturing the part using the predefined models;
   simulate only a portion of the second model to determine if there are defects and/or distortion in the portion simulated, the portion including an area surrounding an interface between adjacent predefined models in the second model; and
   additively manufacture the part according to the second model.

10. The system of claim 9, wherein the energy source power level, the scan path, and the scan speed are dependent on the material being used to additively manufacturing the part.

11. The system of claim 9, wherein the energy source power level, the scan path, and the scan speed create an additively manufactured part that has no defects or distortion.

12. The system of claim 9, wherein the energy source power level, the scan path, and the scan speed are dependent on a temperature at which the part is being additively manufactured.

13. The system of claim 9, wherein the plurality of predefined three-dimensional shapes in the library of predefined three-dimensional shapes includes three-dimensional shapes selected from the group consisting of rings, cylinders, tubes, cuboids, cubes, prisms, pyramids, and combinations thereof.

14. The system of claim 9, wherein the plurality of predefined three-dimensional shapes in the library of predefined three-dimensional shapes include three-dimensional shapes with features selected from the group consisting of fillets, chamfers, and combinations thereof.

15. The system of claim 9, wherein the computer-readable memory, when executed by the at least one processor, will further cause the additive manufacturing system to:
   adjust the second model in the area surrounding the interface between adjacent predefined models to eliminate defects and distortion in the area surrounding the interface.

16. The system of claim 15, wherein adjusting the second model in the area surrounding the interface includes adjusting the energy source power level, the scan path, and the scan speed for the second model in the area surrounding the interface.

* * * * *